US009866755B2

(12) United States Patent
Hasegawa

(10) Patent No.: US 9,866,755 B2
(45) Date of Patent: Jan. 9, 2018

(54) IMAGE CAPTURE APPARATUS AND METHOD FOR CONTROLLING THE SAME

(71) Applicant: CANON KABUSHIKI KAISHA, Tokyo (JP)

(72) Inventor: Reiji Hasegawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/466,265

(22) Filed: Aug. 22, 2014

(65) Prior Publication Data
US 2015/0062348 A1 Mar. 5, 2015

(30) Foreign Application Priority Data

Aug. 28, 2013 (JP) .................................. 2013-177238

(51) Int. Cl.
*G03B 17/20* (2006.01)
*H04N 5/232* (2006.01)
(52) U.S. Cl.
CPC ..... *H04N 5/23293* (2013.01); *H04N 5/23212* (2013.01)
(58) Field of Classification Search
CPC ........... H04N 5/23296; H04N 5/23293; H04N 5/23212
USPC .......................................... 396/296; 348/169
See application file for complete search history.

(56) References Cited

U.S. PATENT DOCUMENTS

| 2005/0031325 | A1 | 2/2005 | Fujii | |
| 2006/0028577 | A1* | 2/2006 | Honjo | ....................... G06T 1/00 348/345 |
| 2007/0139532 | A1* | 6/2007 | Sakurai | ................... H04N 9/735 348/226.1 |
| 2009/0010549 | A1* | 1/2009 | Muramatsu | .......... G06K 9/6256 382/209 |
| 2011/0149269 | A1 | 6/2011 | Van Esch | |
| 2012/0045094 | A1* | 2/2012 | Kubota | ................ G06K 9/3233 382/103 |

(Continued)

FOREIGN PATENT DOCUMENTS

| CN | 1731269 A | 2/2006 |
| CN | 102447832 A | 5/2012 |

(Continued)

OTHER PUBLICATIONS

The above foreign patent documents were cited in the Jan. 5, 2016 Japanese Office Action, which is enclosed without an English Translation, that issued in Japanese Patent Application No. 2013-177238.

(Continued)

*Primary Examiner* — Rodney Fuller
(74) *Attorney, Agent, or Firm* — Cowan, Liebowitz & Latman, P.C.

(57) ABSTRACT

In an image capture apparatus that can perform processing using an image on which information displayed by a display device is superimposed and a method for controlling the same, the influence of the superimposed information included in the image is reduced. A first image in which information displayed by the display device is superimposed on an optical finder image is acquired. Then, the predetermined image processing is performed using a second image that excludes data on a pixel having the display color of the information, of pixels included in the first image.

12 Claims, 7 Drawing Sheets

(56) References Cited

U.S. PATENT DOCUMENTS

2013/0002884 A1* 1/2013 Nakagawara ...... H04N 5/23212
348/169

FOREIGN PATENT DOCUMENTS

| CN | 102857688 A | 1/2013 |
|----|-------------|--------|
| JP | 08-240835 A | 9/1996 |
| JP | 09-181953 A | 7/1997 |
| JP | 2005-055744 A | 3/2005 |
| JP | 2011-134019 A | 7/2011 |
| JP | 2013-034177 A | 2/2013 |

OTHER PUBLICATIONS

Patent documents were cited in the Mar. 31, 2017 Chinese Office Action, a copy of which is enclosed with an English Translation, that issued in Chinese Patent Application No. 201410424075.2.

* cited by examiner

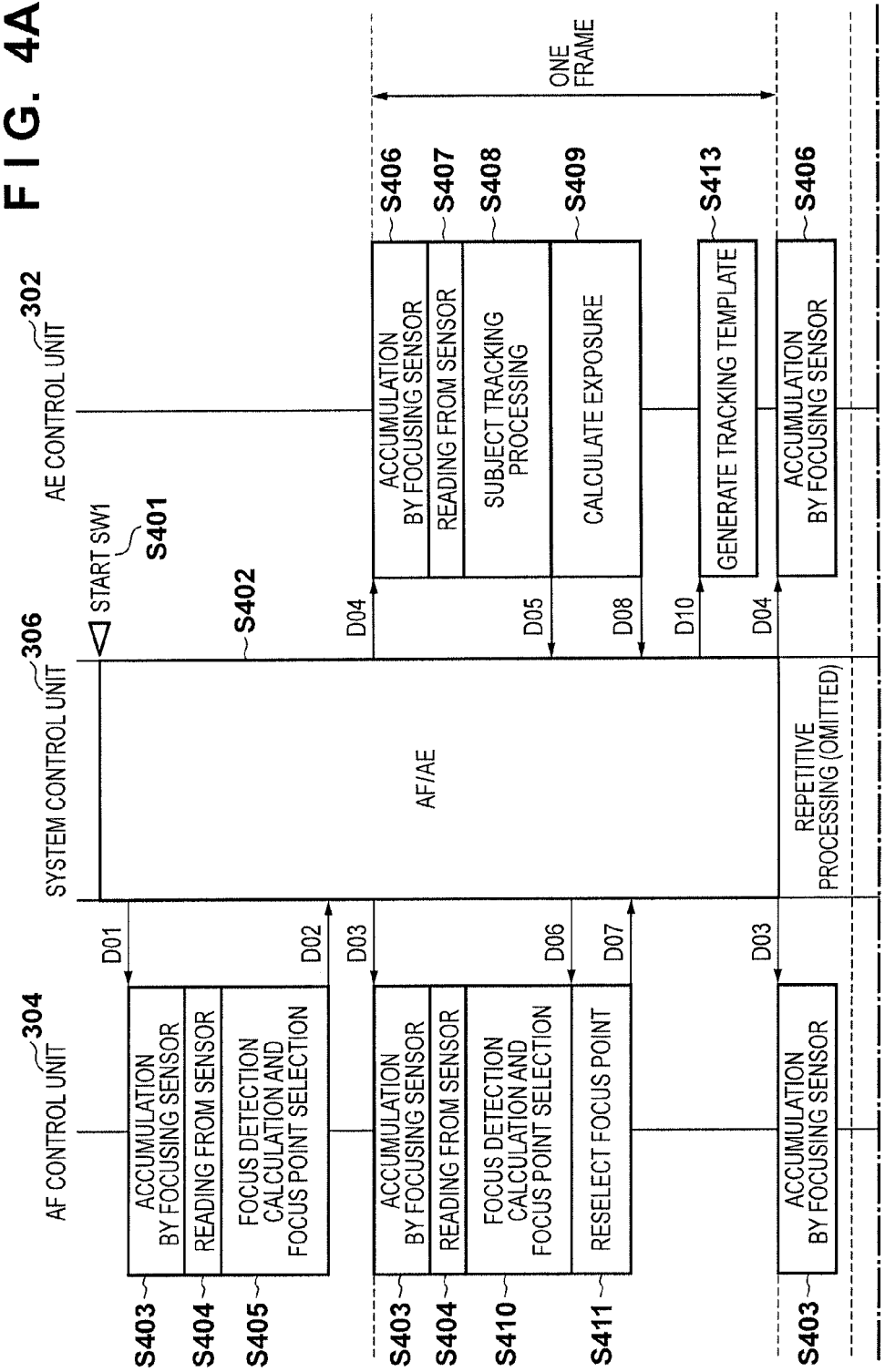

IMAGE CAPTURE APPARATUS AND METHOD FOR CONTROLLING THE SAME

BACKGROUND OF THE INVENTION

Field of the Invention

The present invention relates to an image capture apparatus and a method for controlling the same.

Description of the Related Art

In cameras with an optical finder for example, there are some cameras that display, for convenience of shooting, various types of information such as an in-focus position in autofocus (abbreviated hereinafter as "AF") superimposed on an optical finder image.

On the other hand, there are cameras that acquire, from an optical finder image, data for use in automatic exposure control (abbreviated hereinafter as "AE"). Japanese Patent Laid-Open No. 8-240835 (Patent Document 1) discloses a camera that determines an exposure based on a photoelectric conversion output for each area of an optical finder image obtained using an AE sensor (metering sensor) that receives light of the optical finder image.

As also disclosed in Patent Document 1, in a case in which additional information, such as focus frame, is superimposed on an optical finder image, the metering results of an AE sensor that receives light of an optical finder image are influenced by the superimposed information. Therefore, in Patent Document 1, influence in the metering result due to a focus frame displayed in a superimposed manner is corrected by correcting the metering result for each area obtained by the AE sensor depending on the position of the superimposed focus frame.

By using, as an AE sensor, an image sensor in which a plurality of pixels are two-dimensionally arranged, it is possible to improve degrees of freedom in the position, size, and shape of an area to be metered, and to use a captured image for the purpose of subject detection or tracking, other than metering. For example, by detecting an area of a main subject, it is possible to easily determine the amount of exposure taking into consideration the area of the main subject. However, when the captured image obtained by the AE sensor includes information superimposed on an optical finder image, the precision of data acquired from the captured image may be lowered because it lacks data at a part hidden by the superimposed information or it is influenced by the superimposed information.

The technique of Patent Document 1 can correct influence of a displayed focus frame on the brightness of each area, but not influence of a displayed focus frame on processing that uses data in units of pixels, such as subject detection or subject tracking.

SUMMARY OF THE INVENTION

The present invention was made in view of such conventional problems, and provides an image capture apparatus that can perform processing using an image in which information displayed by a display device is superimposed on an optical finder image and a method for controlling the same, in which an influence of the superimposed information included in the image is reduced.

According to an aspect of the present invention, there is provided an image capture apparatus comprising: an acquiring unit configured to acquire a first image on which information displayed by a display device is superimposed; and a processing unit configured to perform predetermined image processing using a second image that excludes data of a pixel having a display color of the information from pixels included in the first image.

According to another aspect of the present invention, there is provided a method for controlling the image capture apparatus, the method comprising the steps of: acquiring a first image on which information displayed by a display device is superimposed; and performing predetermined image processing using a second image that excludes data of a pixel having a display color of the information, from pixels included in the first image.

Further features of the present invention will become apparent from the following description of exemplary embodiments with reference to the attached drawings.

BRIEF DESCRIPTION OF THE DRAWINGS

FIGS. 4A and 4B are diagrams illustrating processing procedures of an AF control unit, a system control unit, and an AE control unit of FIG. 2, and their correlations.

DESCRIPTION OF THE EMBODIMENTS

Exemplary embodiments of the present invention will now be described in detail in accordance with the accompanying drawings.

Figure 1:
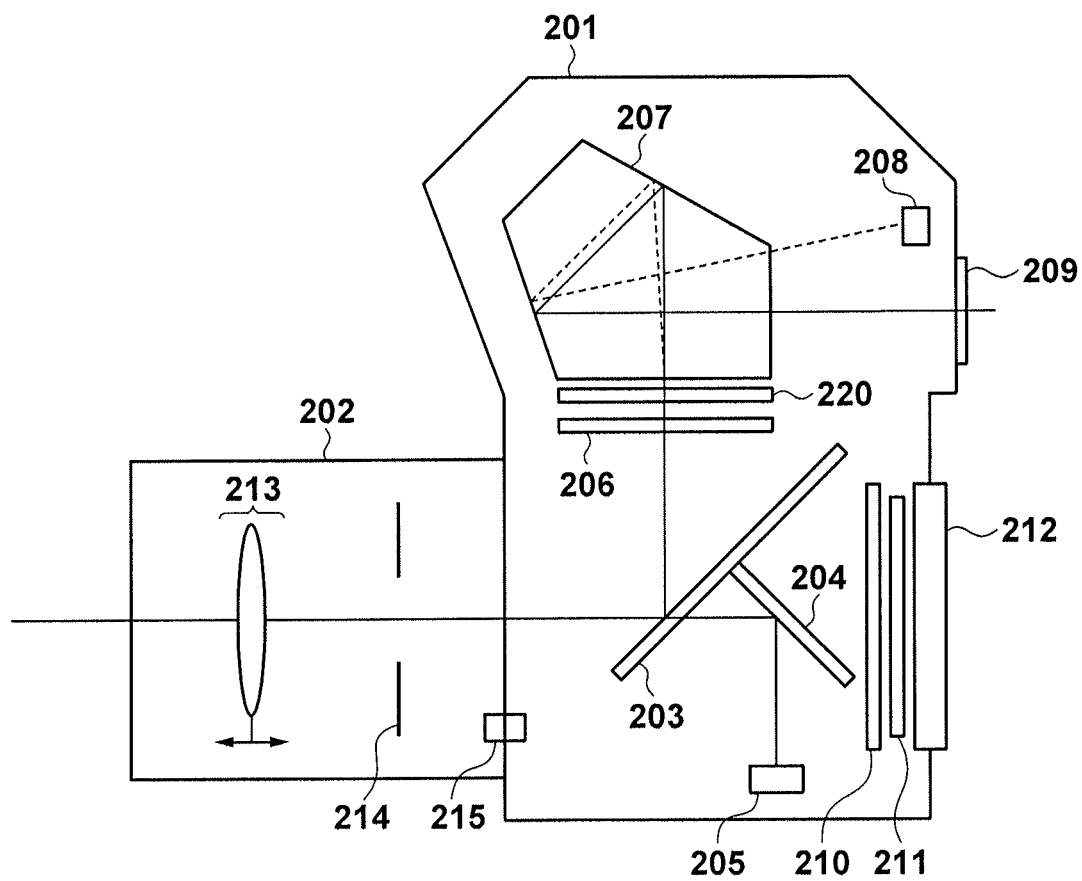
FIG. 1 is a sectional side view illustrating a digital single-lens reflex camera as an example of an image capture apparatus according to embodiments.

FIG. 1 is a sectional side view illustrating an example of arrangement of main constituent components of a digital single-lens reflex camera (DSLR) serving as an example of an image capture apparatus according to an embodiment of the present invention. The DSLR includes a main body 201 and an image-capturing lens 202 that is mounted on the front face of the main body 201. The image-capturing lens 202 is interchangeable, and the main body 201 and the image-capturing lens 202 are mechanically and electrically connected to each other by a lens mount (not shown). The image-capturing lens 202 includes a focusing lens 213 and a diaphragm 214. The focusing lens 213 and the diaphragm 214 operate in accordance with electric control of the main body 201 via a lens mount contact group 215, and adjust focusing of the image-capturing lens 202 or the amount of light incident from the image-capturing lens 202.

A main mirror 203 is a half mirror and has a sub mirror 204 on the rear surface of the main mirror 203. In the shown non mirror lock-up state, the main mirror 203 reflects some of the light flux from the image-capturing lens 202 so that it is incident on a finder optical system provided above, and reflects, using the sub mirror 204, the transmitted light so that it is incident on an AF unit 205 provided below. In the mirror lock-up state such as during exposure, the mirror moves away from the light path.

Figure 3:
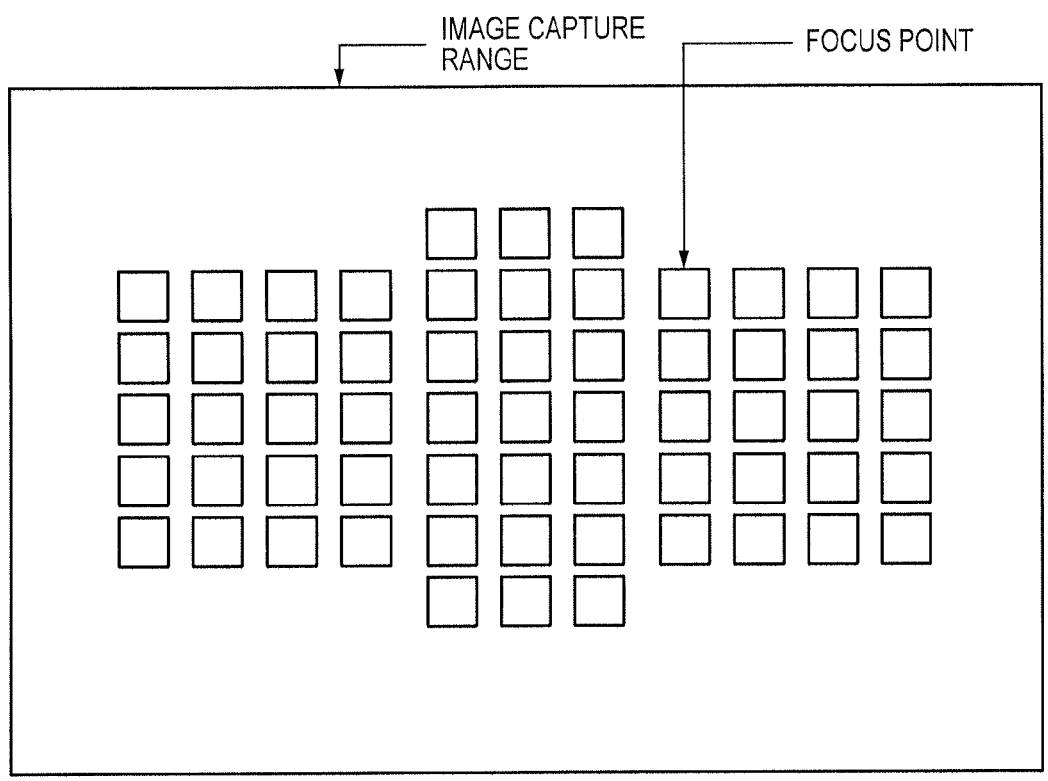
FIG. 3 is a diagram illustrating an example of focus point arrangement and an image capture range of the digital single-lens reflex camera according to the embodiments.

The AF unit 205 is an AF sensor of a phase-difference detection method. The AF unit 205 detects the defocus amount and the focus direction of the image-capturing lens 202 by forming a secondary imaging surface of the image-capturing lens 202 on a focus detection line sensor included in the AF unit 205, and drives the focusing lens 213 based on the detection result, thereby performing automatic focusing adjustment. Since focusing control by the phase-difference detection method is well known and a well-known configuration is applicable to the AF unit 205, detailed descriptions of a configuration and focusing control of the AF unit 205 are omitted. In the AF unit 205 according to the present embodiment, sixty-one focus points (also referred to as focus detection areas or AF frames) are laid out as shown in FIG. 3.

A focus plate 206 is a translucent plate-like member that is arranged on a supposed imaging surface of the image-capturing lens 202 serving as the finder optical system. Furthermore, a finder display device 220 is arranged on the supposed imaging surface of the image-capturing lens 202 or in the vicinity thereof. The finder display device 220 is, for example, a transmissive liquid crystal display and displays information such as a frame of focus points shown in FIG. 3. By monitoring the focus plate 206 from an eye piece 209 through a pentaprism 207 for shifting a finder light path, a user can view an image in which image-capturing information displayed by the finder display device 220 is superimposed on an optical image in the field of view to be captured. Note that the finder display device 220 may be a display device of another method such as a light emitting diode (LED), an organic light emitting diode (OLED), or an organic EL display, or a plurality of display devices. Furthermore, a display device of a different method may be used depending on a display content.

An AE unit 208 converts an optical finder image into an image data for metering using an AE sensor having a plurality of pixels, in order to observe the brightness of the subject. Here, the AE sensor captures an image in a range of the optical finder image that is shown as the image capturing range in FIG. 3. Information such as the frame of focus points displayed by the finder display device 220 is superimposed on this optical finder image. The AE sensor may have the same configuration as that of an image sensor 211, except for the number of pixels, but the reason why it is called an "AE sensor" is that it is used mainly for detecting the luminance of the subject. The image data for metering includes R, G, and B components. In the present embodiment, the AE unit 208 performs, using the generated image data for metering, detection of the brightness of a subject, calculation of exposure, subject detection, subject tracking, and the like. Note that it is also possible to extend a dynamic range of the image data for metering by summing a plurality of pieces of image data for metering, as needed.

The image sensor 211 is a CMOS image sensor, a CCD image sensor, or the like in which a plurality of pixels that each have a photoelectric conversion device are aligned. By moving the main mirror 203 and the sub mirror 204 away from the image-capturing light path, and opening a focal plane shutter 210, the image sensor 211 is exposed to light and an optical image of the subject is captured.

A display 212 is, for example, a liquid crystal display (LCD), and is used as an electric view finder by displaying a live view image, and is used for display of various types of setting values, image-capturing information, apparatus information, a GUI screen, a captured image, or the like.

Figure 2:
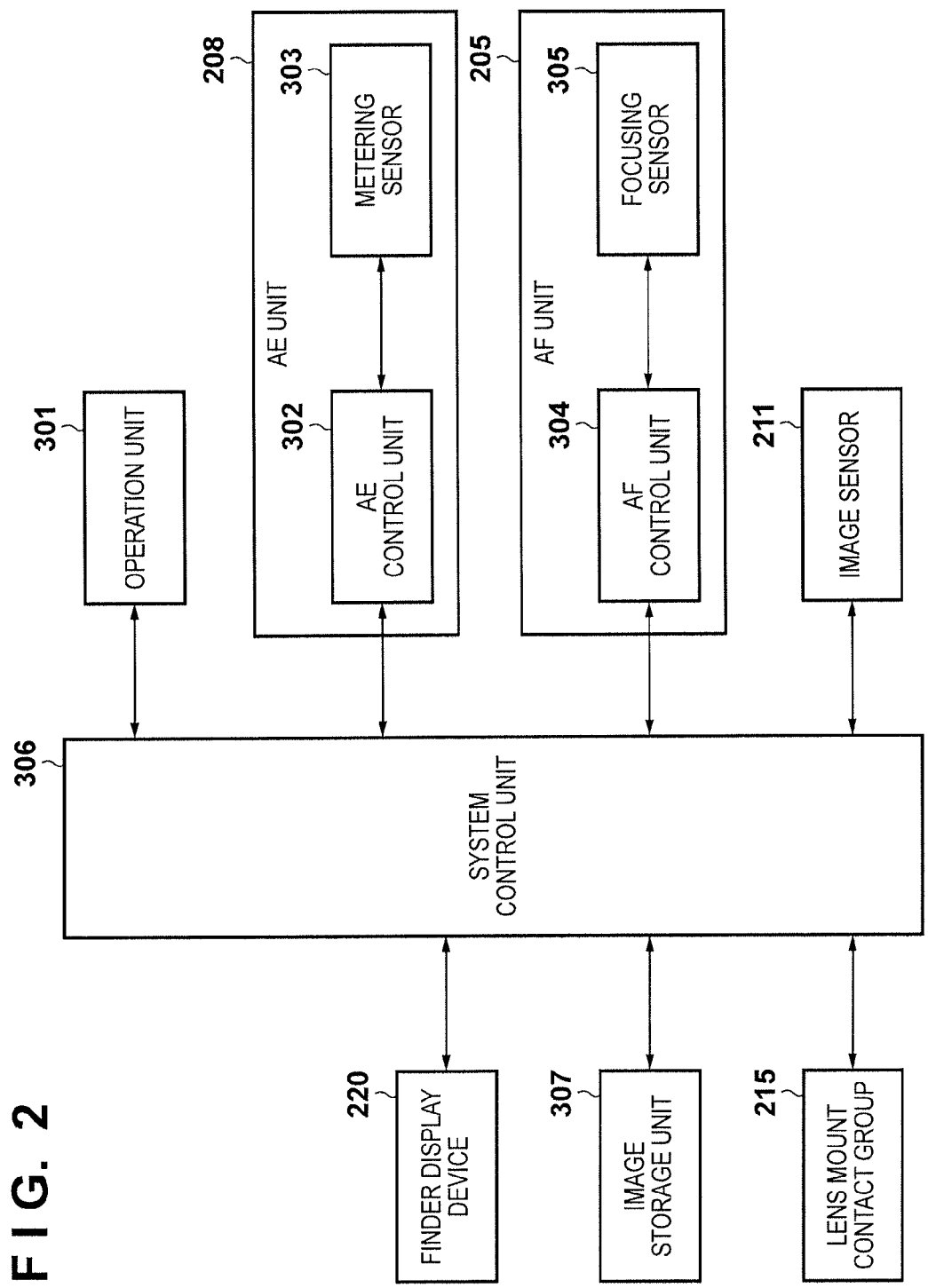
FIG. 2 is a block diagram illustrating an example of a functional configuration of the digital single-lens reflex camera according to the embodiments.

FIG. 2 is a block diagram illustrating an example of a functional configuration of the DSLR of the present embodiment. Note that the same reference numerals are given to the same constituent components as those in FIG. 1.

An operation unit 301 detects an operation performed by a user via a button, a switch, a dial, a connection device, and the like that are provided on the main body 201 or the image-capturing lens 202, and outputs a signal that corresponds to the operation content to the system control unit 306. The operation unit 301 also transmits an SW1 signal or a SW2 signal depending on the amount of pressing of a release button. Specifically, the SW1 signal is output to the system control unit 306 when the release button is pressed about half-way down, and the SW2 signal is output to the system control unit 306 when the release button is further pressed down to a predetermined extent. Note that the pressed state of the release button when the SW1 signal is output is referred to as "half-way pressed" state, and the pressed state of the release button when the SW2 signal is output is referred to as "all the way pressed state". Furthermore, the state in which the half-way pressed state of the release button is maintained is referred to as a "SW1 holding state", and the state in which the all the way pressed state of the release button is maintained is referred to as a "SW2 holding state". Furthermore, the operation unit 301 outputs an SW1 cancel signal to the system control unit 306 when the pressed amount of the release button is less than a value at which the SW1 signal is transmitted, and outputs a SW2 cancel signal to the system control unit 306 when the pressed amount of the release button is less than a value at which the SW2 signal is transmitted.

As described above, the AF unit 205 drives the focusing lens 213 to the in-focus position (automatic focusing adjustment) based on the automatic focus detection by the phase-difference detection method and the focus detection result. The AF unit 205 is constituted by an AF control unit 304 and a focusing sensor 305. The focusing sensor 305 is constituted by a plurality of line sensors that respectively correspond to, for example, the sixty-one focus points shown in FIG. 3 and converts light that is incident via the sub mirror 204 into electric signals, and outputs a pair of image signals for each focus point to the AF control unit 304. The AF control unit 304 calculates, based on the phase difference between the pair of image signals output from the focusing sensor 305, the defocus amounts of the focus points shown in FIG. 3, and selects one focus point to be focused. Then, the AF control unit 304 outputs, to the system control unit 306, a defocus map that has the defocus amounts of the respective focus points as data, and position data on the selected focus point. The system control unit 306 performs focus adjustment calculation based on the selected focus position and the defocus map, and controls the position of the focusing lens 213 so as to bring the focusing lens 213 into focus on the selected focus point.

The AE unit 208 performs automatic exposure calculation and subject tracking. The AE unit 208 is constituted by an AE control unit 302 and a metering sensor 303. The AE control unit 302 performs automatic exposure calculation based on the image data for metering read out from the metering sensor 303, and outputs the calculation result to the system control unit 306. Based on the result of the automatic exposure calculation output from the AE control unit 302, the system control unit 306 controls the aperture of the diaphragm 214 (size of the opening) so as to adjust the amount of light that is incident on the main body 201.

Furthermore, in the SW1 holding state and during continuous shooting, the AE control unit 302 tracks the subject by sequentially detecting the subject using the image data for metering sequentially obtained through continuous shooting by the metering sensor 303, and outputs positional information on the detected subject to the system control unit 306. The subject detection processing and the subject tracking processing will be described in detail later. The system control unit 306 outputs the positional information on the subject that was output by the AE control unit 302 to the AF control unit 304.

The AF control unit 304 calculates the defocus amount of the focus point present at the position of the subject that was output by the system control unit 306 or in the vicinity thereof, and compares the calculation result with a threshold set in advance. If the comparison result shows that the defocus amount is less than the threshold, the AF control unit 304 updates the position data on the selected focus point to be output to the system control unit 306, such that the focus point selected by the AF control unit 304 based on the defocus amount of each focus point is updated to the focus point at the subject or the vicinity thereof.

When a SW2 signal is output from the operation unit 301, the system control unit 306 lets the main mirror 203 (and the sub mirror 204) be in the up position so as to be moved away from the light path. Then, the focal plane shutter 210 is driven, and the image sensor 211 is exposed to light for a time period that corresponds to the result of the automatic exposure calculation. When the exposure time has elapsed, the system control unit 306 lets the main mirror 203 (and the sub mirror 204) be in the down position.

The image sensor 211 converts light that is incident via the image-capturing lens 202 during an exposure time into an electric signal for each pixel to generate image data, and outputs the generated image data to the system control unit 306. The system control unit 306 applies predetermined image processing to the image data output from the image sensor 211, and displays the processed image data on the display 212 or writes it into an image storage unit 307.

Hereinafter, operation of the DSLR according to the present embodiment will be described.

Figure 4B:
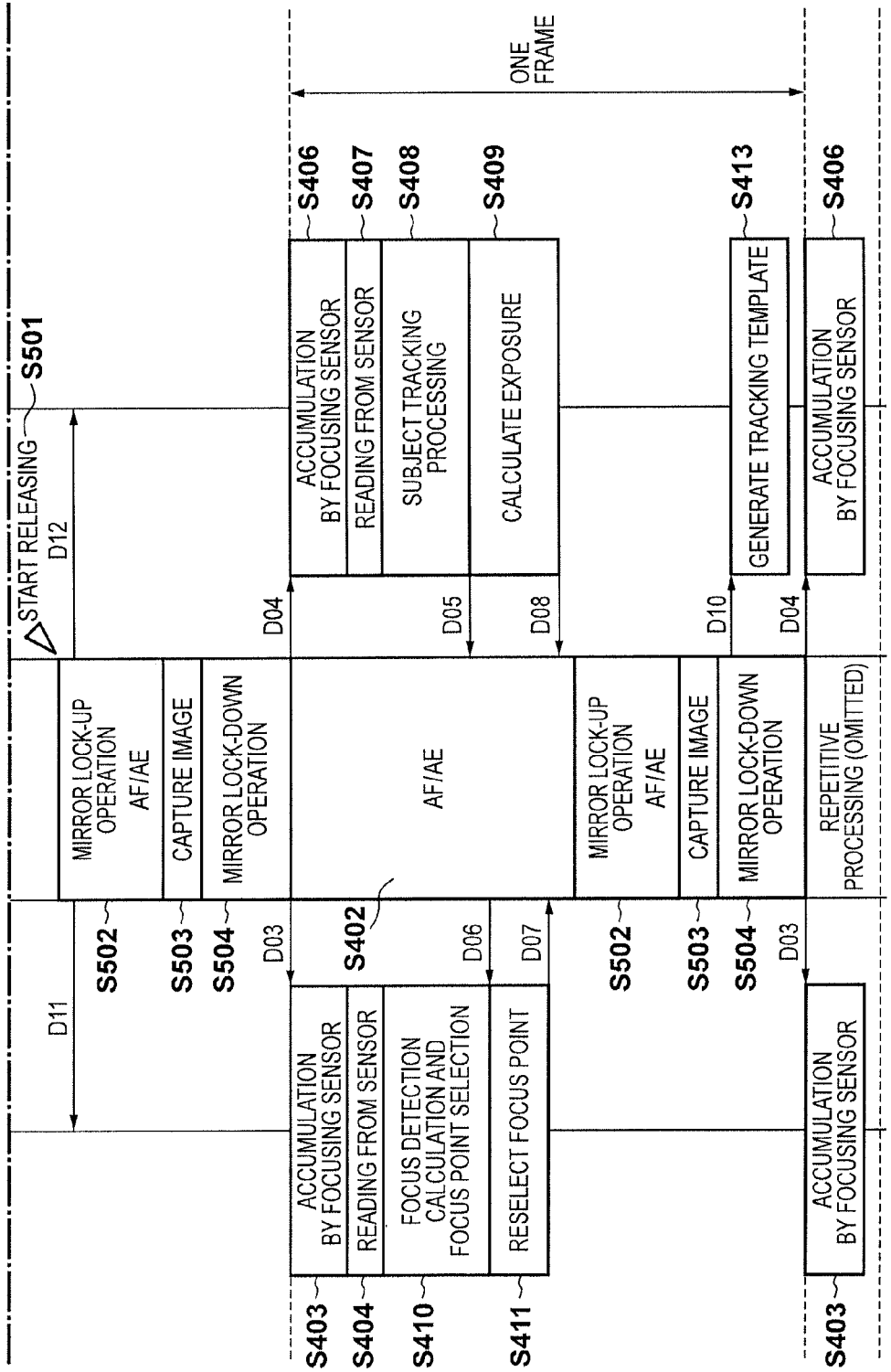

FIGS. 4A and 4B are diagrams illustrating operation sequences of the AF control unit 304, the system control unit 306, and the AE control unit 302, and the first half of the sequences shows the operation sequences in the SW1 holding state, and the second half of the sequences shows the operation sequences in the SW2 holding state. Note that FIGS. 4A and 4B intend to show the processing procedure of each control unit and operation timings, and there is no association between the size (height) of a processing block and the length of the processing time of not only for different control units but even for the same unit.

Step S401 shows a timing at which a release button is pressed half-way down and an SW1 signal is output from the operation unit 301 to the system control unit 306. The system control unit 306 that has received the input of the SW1 signal starts an AF/AE operation and outputs an AF start signal D01 to the AF control unit 304, and the AF control unit 304 starts the operation.

In step S403, the AF control unit 304 lets the focusing sensor 305 perform accumulation.

In step S404, the AF control unit 304 reads out an image signal from the focusing sensor 305.

In step S405, the AF control unit 304 performs focus detection calculation with respect to the focus point arbitrarily selected by the user, the calculation being based on the read out image signal. Alternatively, the AF control unit 304 performs focus detection calculation by acquiring data on the distances between a plurality of focus points and the subject, based on the read out image signal, and selecting the focus point from which data on the shortest distance was acquired. The AF control unit 304 outputs, to the system control unit 306, a focus calculation result signal D02 that includes a defocus map and position data on the selected focus point.

The system control unit 306 drives, in accordance with the focus calculation result signal D02, the focusing lens 213 so as to bring the focusing lens 213 into focus on the selected focus point, and performs focusing adjustment. When the focusing adjustment is completed, the system control unit 306 outputs an AF start signal D03 to the AF control unit 304, and an AE start signal D04 to the AE control unit 302.

In step S406, upon receiving the AE start signal D04, the AE control unit 302 starts an accumulation operation (that is, image-capturing) by the metering sensor 303. Because the AF control unit 304 that has received the AF start signal D03 also starts an accumulation operation by the focusing sensor 305, the accumulation operations by the focusing sensor 305 and the metering sensor 303 are started at the same timing. With this, image signals (images) in which the same scene is captured at the same timing are obtained from the focusing sensor 305 and the metering sensor 303.

In step S407, the AE control unit 302 reads out image data for metering from the metering sensor 303.

In step S408, the AE control unit 302 performs subject tracking processing. The AE control unit 302 sets a template image that is generated in tracking template generation processing (S413) executed beforehand as a tracking target image, and performs template matching between the image data generated in step S407 and the template image. Then, the AE control unit 302 detects the position of the tracking target (coordinate of the subject) in the generated image as a subject tracking result.

A subject tracking result D05 detected by the AE control unit 302 is relayed by the system control unit 306, and is notified, as a subject tracking result D06, to the AF control unit 304. Note that, when no template image was generated, the subject tracking processing in step S408 is omitted.

In step S409, the AE control unit 302 performs exposure calculation based on the image data for metering read out in step S407, and outputs an exposure calculation result D08 to the system control unit 306.

On the other hand, the AF control unit 304 that has received the AF start signal D03 that was output by the system control unit 306 at the same time as the AE start signal D04 executes, as described above, the procedures from steps S403 to S404 and focus detection in step S410 that is the same procedure as in step S405.

In step S411, the AF control unit 304 receives the subject tracking result D06 via the system control unit 306, and determines whether the closest focus point or the focus point selected in step S410 is to be used. Then, the AF control unit 304 outputs, to the system control unit 306, a focus calculation result signal D07 that includes a defocus map and position data on the selected focus point. Note that the selected focus position may be data indicating the specific position of the focus point, but may be data with which the focus point can be identified, such as the focus point number, when positional data on each focus point is separately available.

The system control unit 306 performs focusing adjustment based on the position data on the selected focus point and the defocus map that are included in the focus calculation result signal D07. Furthermore, the system control unit 306 determines whether or not the selected focus point has been changed, based on the position data on the selected focus point included in the focus calculation result signal D07 and previous position data on the selected focus point. If the selected focus point has been changed (reselected), the system control unit 306 sets a focus point reselection flag to "TRUE", while if the selected focus point has not been changed (reselected), the system control unit 306 sets the focus point reselection flag to "FALSE". The system control unit 306 notifies the AE control unit 302 of the position data on the selected focus point included in the focus calculation result signal D07 and the focus point reselection flag, as data D10.

In step S413, the AE control unit 302 generates a tracking template based on the data D10. The detail of this processing will be described later. The tracking template generated here is used in subject tracking processing in the next frame onward.

Upon output of the SW2 signal being started in step S501, the system control unit 306 starts main image-capturing processing after the AE control unit 302 has performed the exposure calculation (and generation of a tracking template in step S413, if needed) in step S409 in repetitive processing. Note that it is also possible that the main image-capturing processing starts at the time of completion of the exposure calculation, and generation of the tracking template is executed in background processing.

In the main image-capturing processing, the system control unit 306 lets, in step S502, the main mirror 203 (and the sub mirror 204) be in the up position so as to be moved away from the light path and starts the AF/AE operation. Furthermore, driving of the focusing lens 213 and control of the diaphragm 214 and the focal plane shutter 210 are performed based on the exposure calculation result and the defocus amount of the selected focus point that were obtained immediately before, and main image-capturing is performed in step S503. Thereafter, in step S504, the system control unit 306 lets the main mirror 203 (and the sub mirror 204) be in the down position.

Furthermore, upon output of the SW2 signal being started, the system control unit 306 outputs a release start signal D11 the AF control unit 304 and a release start signal D12 to the AE control unit 302. The AF control unit 304 and the AE control unit 302 that have received the release start signals D11 and D12 halt processing that is being executed at that time. Then, if the SW2 signal was output when the mirror lock-down operation S504 was completed, the system control unit 306 outputs an AF start signal D03 to the AF control unit 304 and an AE start signal D04 to the AE control unit 302. Then, the main image-capturing processing of the second frame of the continuous shooting starts. From the second frame onwards, the processing starts from steps S403 and S406. If the focus point has changed in step S411 of the processing in the second frame, the main image-capturing is executed in step S503 and then generation of a new tracking template for use in the next frame is executed by the AE control unit 302 (S413).

Figure 5A:
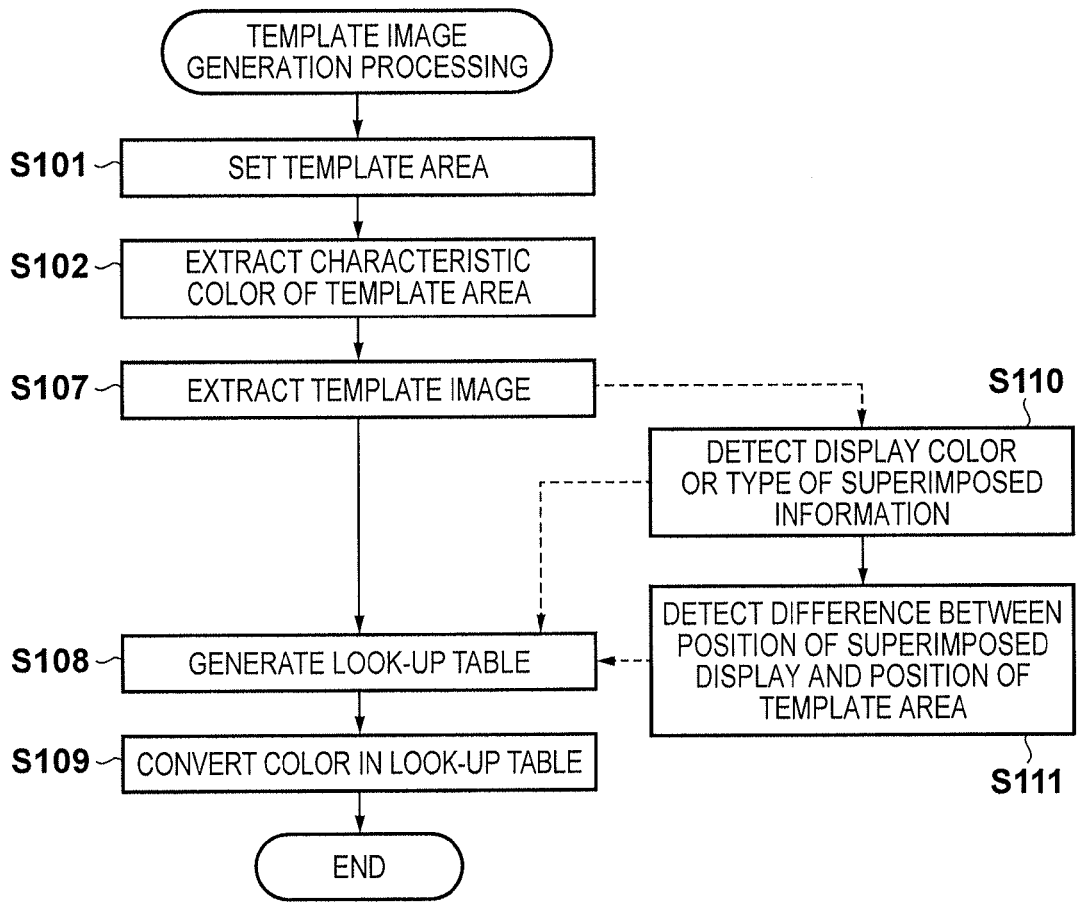
FIG. 5A is a flowchart illustrating procedures of template image generation processing of the digital single-lens reflex camera according to the embodiments.
Figure 5B:
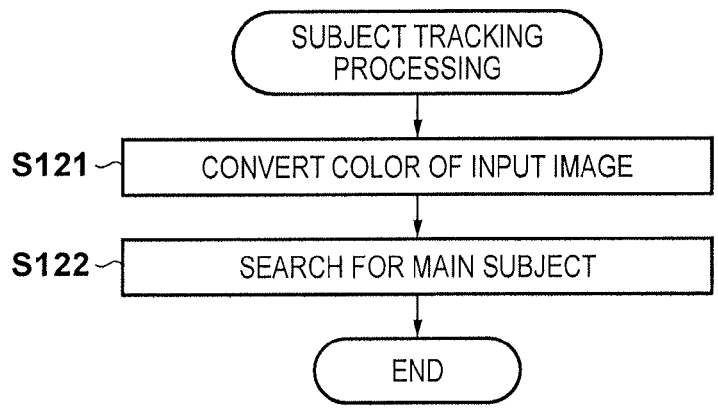
FIG. 5B is a flowchart illustrating procedures of subject tracking processing of the digital single-lens reflex camera according to the embodiments.

Hereinafter, the subject tracking processing in step S408 and the template image generation processing in step S413 will be described with reference to the flowcharts of FIGS. 5A and 5B.

First, the template image generation processing in step S413 will be described with reference to the flowchart shown in FIG. 5A.

In step S101, the AE control unit 302 determines, based on the data D10, an area to be extracted as a template from the image data for metering generated in step S407. If the focus point reselection flag is "TRUE", the focus point has been selected based on the detection result of the subject tracking processing in step S408 executed immediately before. Therefore, the AE control unit 302 sets, as a template area (predetermined area), an area that has the predetermined size and shape and is centered on the position obtained in the subject tracking processing. On the other hand, if the focus point reselection flag is "FALSE", the AE control unit 302 sets, as a template area (predetermined area), an area that has the predetermined size and shape and is centered on the position of the selected focus point included in the data D10.

If the result of the subject tracking processing is not adopted in the selection of the focus point, this means that the template image for tracking is not appropriate, and thus such branching processing is executed.

In step S102, the AE control unit 302 calculates color distribution of pixels in the template area (in the predetermined area), and detects a characteristic color of the tracking target. The detection of the characteristic color can be performed in the following manner, for example. First, an RGB color space is divided into eight levels of 0 to 7 with respect to the strengths of the R signal, the G signal, and the B signal. With this, the RGB color space is divided into 512 blocks (8×8×8) (coordinates). Then, a color signal of each pixel of the template area is converted into RGB color data, and the data is classified, based on the strengths of the R signal, the G signal, and the B signal, into a corresponding block (coordinates) of the RGB color space. This procedure is executed for all the pixels in the template area, and a color (RGB) that corresponds to the block, of 512 blocks, into which most pixels are classified is set as a characteristic color of the tracking target.

Note that if there are a plurality of blocks into which most pixels are classified, the colors that correspond to these plurality of blocks are set as characteristic colors of the tracking target. Furthermore, it is also possible that, instead of the block into which most pixels are classified, one or more blocks into which the predetermined number of pixels or more are classified, or a predetermined number of blocks into which the higher-ranked numbers of pixels are classified may be used for setting characteristic colors of the tracking target. Furthermore, when the number of pixels that are classified into the block into which most pixels are classified is a predetermined threshold or more, or when a difference between the number of pixels classified into the block into which most pixels are classified and the number of pixels classified into the block into which the second largest number of pixels are classified is a predetermined threshold or more, it is also possible to set the color that corresponds to only the block into which most pixels are classified, as a characteristic color.

In step S107, the AE control unit 302 cuts the template area out of the metered image, and generates a template area image.

In step S108, the AE control unit 302 generates a three-dimensional look-up table that converts a specific color into a high luminance color and the other colors into low luminance colors. Specifically, a look-up table is generated that converts the characteristic color of the tracking target into a high luminance color and the other colors into low luminance colors, and converts the color that is used in displaying information such that it is superimposed on an optical finder image into a low luminance color even when that color is included in the characteristic color of the tracking target. In the most simplified case, a look-up table may be one that converts an image into a binary image in which a low luminance is 0 (black) and a high luminance is 1 (white).

Figure 6A:
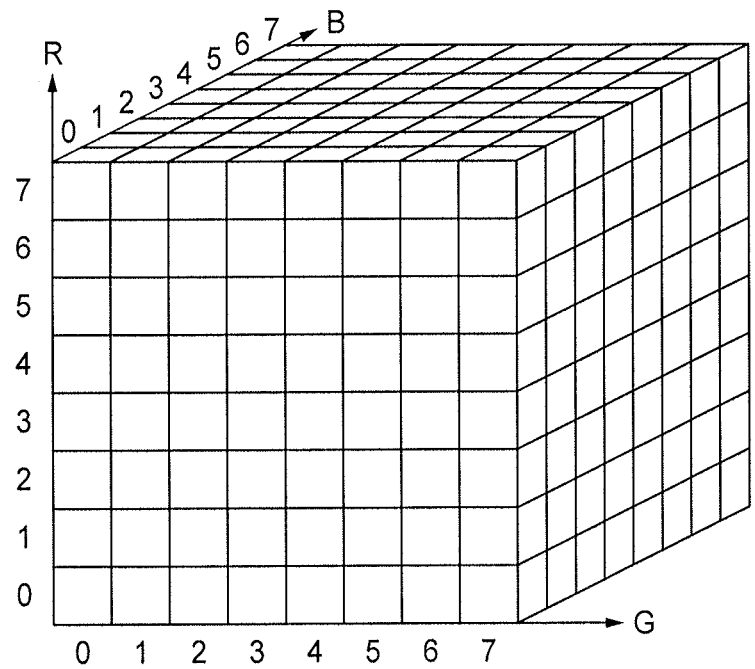
FIG. 6A is a diagram schematically illustrating an RGB color space for use in extraction of a characteristic color of a tracking target according to the embodiments.
Figure 6B:
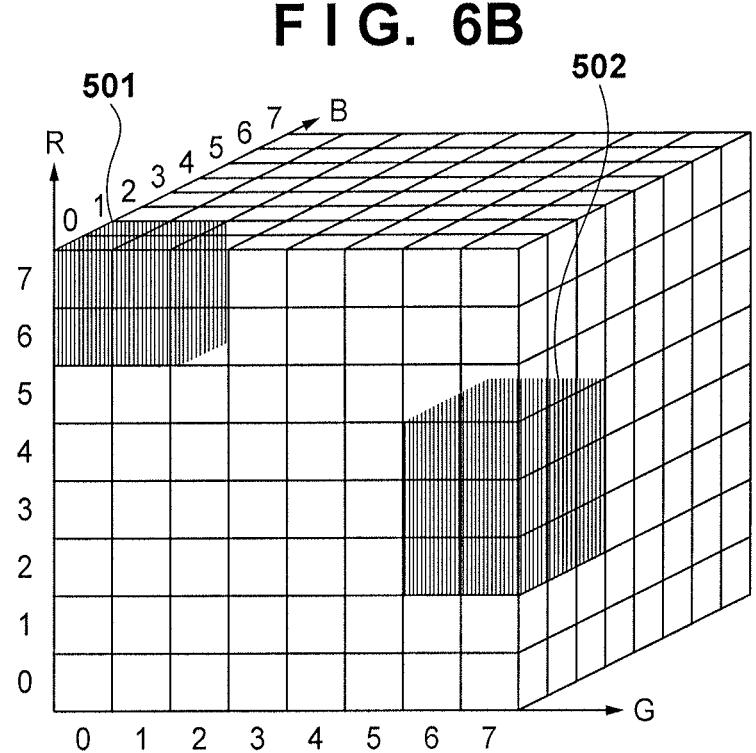
FIG. 6B is a diagram illustrating examples of characteristic color blocks and excluded blocks that are registered in a look-up table according to the embodiments.

FIG. 6B is a diagram schematically illustrating examples of characteristic color blocks and excluded blocks that are registered in a look-up table, the characteristic color blocks and excluded blocks being shown in the RGB color space shown in FIG. 6A. In this way, the color that is to be converted into a high luminance color is registered in units of RGB blocks. FIG. 6B shows the example in which the characteristic color of the tracking target determined in step S102 corresponds to (is distributed over) a plurality of blocks (R, G, B)=(2, 6, 0) to (4, 7, 2).

Furthermore, excluded blocks 501 are shown as an example where the finder display device 220 is a red LED, and the coordinates of the excluded blocks 501 are (R, G, B)=(6, 0, 0) to (7, 1, 1). Characteristic color blocks that correspond to the excluded blocks 501 are not registered, and thus after the look-up table is applied, the excluded blocks 501 are converted so as to have a low luminance.

If a color that is used for the finder display device 220 to display information in a superimposed manner has been determined in advance, it is possible to prepare data (for example, RGB coordinates of the block) for specifying the blocks (excluded blocks) in a histogram space that correspond to the color. Then, when actively generating in step S108 a look-up table according to the characteristic color of a tracking target, the AE control unit 302 can reference the data on these excluded blocks so that blocks of the characteristic color that is the same as the color of the excluded blocks are prevented from being registered in the look-up table.

Furthermore, before generating the look-up table in step S108, the AE control unit 302 may perform processing (S110) for detecting a color used in display on the finder display device 220 according to the need. Although the processing is indicated between steps S107 and S108 in FIG. 5A, the processing may be executed in another timing such as before step S101. Also, the AE control unit 302 deletes, from the data on the excluded blocks, data on blocks that correspond to colors that are not used in display at that time, and then generates a look-up table. With this, it is possible to register a characteristic color that is the same as the information display color that is actually not used in the look-up table, resulting in an improvement in precision of the subject tracking.

Note that the processing in step S110 may be detection of the type of displayed information, instead of detection of a display color. In this case, detection of the display color may be performed based on the correspondence relationship between the predetermined information and the displayed color. Furthermore, if, instead of detecting the display color, the data on excluded blocks has a format in which the type of the information and data for specifying the excluded blocks are associated with each other, it is possible to delete the corresponding data on the excluded blocks from the detection result of the type of the displayed information. Note that if information of the same type is displayed in different colors depending on the values, it suffices to associate a plurality of excluded blocks with one type of display information.

Furthermore, it is also possible that the AE control unit 302 detects a difference between the predetermined position at which information is displayed and the position of the template area set in step S101 (for example, a distance between the centers of the positions or a shortest distance therebetween) (in step S111), and generates a look-up table taking into consideration the difference. For example, if it is determined that the difference between the position of the template area and the position at which the information is displayed is the predetermined value or more, and they are separated from each other sufficiently to the extent that they are distinguishable, the display color of this information does not need to be deleted from the excluded blocks. Particularly, when the range of the characteristic color of the tracking target is small and the characteristic color blocks belong to the excluded blocks, the amount of the characteristic color of the tracking target that is converted into a high luminance color may be reduced and the precision of tracking may deteriorate. However, when the template area and the display position are separated from each other, it is less likely that the information display is misrecognized as the tracking target despite the similar colors, so it is possible to improve the tracking precision by deleting the display color from the excluded blocks.

On the other hand, if it is determined that a difference between the position of the template area and the position at which the information is displayed is less than the predetermined value, and they are close to each other or overlap each other, the AE control unit 302 may notify the system control unit 306 thereabout and the system control unit 306 may temporarily stop the display. Note that when there are a plurality of display positions, such control may be performed for each of these display positions.

Furthermore, because an information display color is a single color and originally corresponds to one pair of coordinates of the RGB color space, it is in principle sufficient to exclude only the display color. However, the information display color that is detected from the image data for metering captured by the metering sensor 303 is not necessarily the same as the set display color. Accordingly, in the present embodiment, the excluded blocks are used in order to exclude not only the display color itself but also a similar color. However, if the display color can be excluded, the size of the excluded blocks may be smaller than that of the characteristic color blocks. In other words, the range of colors similar to the display color may be set to be smaller than the unit of the range of the characteristic color.

Note that both of steps S110 and S111 may be executed, and in this case, the AE control unit 302 can generate a look-up table taking into consideration only excluded blocks that correspond to the blocks whose display positions are close to the template area, of the actually displayed information.

In step S109, the AE control unit 302 applies the look-up table generated in step S108 to each pixel of the template area image, and generates a luminance image in which the pixels having a characteristic color are converted so as to have a high luminance and pixels having other colors are converted so as to have a low luminance, the luminance image serving as an ultimate template image.

In the subject tracking processing in step S408, template matching is performed using this template image. With this, template matching can be performed using the luminance image with the characteristic color of the tracking target emphasized, so it is possible to reduce the calculation load as compared with the template matching simply using a color image.

Hereinafter, the subject tracking processing (subject detection processing) in step S408 will be described with reference to the flowchart shown in FIG. 5B.

In step S121, the AE control unit 302 applies the look-up table generated in step S108 to each pixel of the metered image obtained from the metering sensor 303 in step S407. That is, a color-converted image (luminance image) is generated in which pixels having the characteristic color extracted in the template generation processing (S413) performed on the last frame before the moving image captured by the metering sensor 303 are converted so as to have a high luminance, and pixels having the other colors are converted so as to have a low luminance. Due to the characteristics of the above-described look-up table, pixels having a color that corresponds to the display color of the finder display device 220 (or the display color and a similar color) are converted in principal so as to have a low luminance.

In step S122, the AE control unit 302 detects, as a detection target, an area of the color-converted image that has the highest association with the template image, by performing template matching using the template image generated in the template generation processing (S413) performed on the last frame.

Since template matching using such an image in which color conversion has been performed enables the processing using a luminance image without loss of data on the characteristic color of the tracking target, it is possible to reduce the calculation load as compared with the template matching simply using a color image.

The AE control unit 302 adds the position of the detected tracking target to the subject tracking result D05, and outputs it to the system control unit 306. The system control unit 306 outputs the position of the tracking target, as the subject tracking result D06, to the AF control unit 304.

In the focus point reselection processing in step S411, the AF control unit 304 searches for a focus point that includes the position of the tracking target notified together with the subject tracking result D06, or a focus point in the vicinity thereof (within a predetermined range). If there is a corresponding focus point, reselection processing for setting this focus point to a newly selected focus point will be performed.

As described above, according to the present embodiment, when processing is performed using an image in which information displayed by a display device is superimposed on an optical finder image, as an image for use in metering for example, use of data on pixels, included in an image, that have a color that is the same as or similar to the color displayed in a superimposed manner is prevented. With this, it is possible to reduce influence of information displayed in a superimposed manner on image processing, and to improve the precision of subject detection processing or subject tracking processing using, for example, an image for metering.

Other Embodiments

Although the exemplary embodiments of the present invention have been described, the present invention is not limited to these embodiments, and various modifications and changes are possible within the scope of the spirit of the present invention.

For example, with respect to the method for recognizing the position of a subject, not only a subject tracking method using template matching but also a subject tracking method using color data may be used. Besides, dynamic analysis using an optical flow, or a scene recognition technique by edge detection may be used.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-177238, filed on Aug. 28, 2013, which is hereby incorporated by reference herein its entirety.

What is claimed is:

1. An image capture apparatus comprising,
    a finder optical system that includes an imaging surface of an image-capturing lens and a display device configured to transmit light forming an optical image and to display information;
    an acquiring unit configured to acquire a first image that is a combined image of the optical image formed on the imaging surface and the information displayed by the display device; and
    a processing unit configured to perform predetermined image processing using a second image that excludes data of a pixel having a display color of the information from pixels included in a predetermined area of the first image,
    wherein the predetermined image processing is subject detection processing or subject tracking processing that uses characteristic colors of pixels included in the second image, and
    wherein, when a difference between a position of the predetermined area and a position of the information in the first image is a predetermined value or more, the processing unit performs the predetermined image processing using an image that does not exclude data of a pixel having the display color of the information.

2. The image capture apparatus according to claim 1, further comprising:
    a converting unit configured to convert an image according to the predetermined area of the first image into a binary image in which a pixel having a color that is different from the display color among the characteristic colors and a pixel having the other colors are displayed with different values,
    wherein the processing unit performs the subject detection processing or the subject tracking processing using the binary image as the second image.

3. The image capture apparatus according to claim 1, wherein, when a color space s divided into a plurality of blocks and each of pixels included in the predetermined area s assigned to one of the plurality of blocks based on its color, the characteristic colors are colors that correspond to one of the plurality of blocks to which the largest number of pixels are assigned.

4. The image capture apparatus according to claim 3, wherein the processing unit performs the predetermined image processing using an image, as the second image, that excludes data of a pixel having a color that corresponds to a block including the display color, of the plurality of blocks.

5. The image capture apparatus according to claim 1 wherein the acquiring unit acquires the first image using a metering sensor.

6. The image capture apparatus according to claim 1, wherein the processing unit performs the predetermined image processing using an image, as the second image, that excludes data on a pixel having a display color that is actually used to display the information, among display colors can be used by the display device.

7. The image capture apparatus of claim 1, wherein the display device is arranged on or in a vicinity of the imaging surface.

8. A method for controlling an image capture apparatus, wherein the image capture apparatus comprises a finder optical system including an imaging surface of an image-capturing lens and a display device configured to transmit light forming an optical image and to display information, the method comprising:
    acquiring a first image that is a combined image of the optical image formed on the imaging surface and the information displayed by the display device is superimposed; and
    performing predetermined image processing using a second image that excludes data of a pixel having a display color of the information, from pixels included in a predetermined area of the first image,
    wherein the predetermined image processing is subject detection processing or subject tracking processing that uses characteristic colors of pixels included in the second image, and
    wherein, when a difference between a position of the predetermined area and a position of the information is a predetermined value or more the performing performs the predetermined image processing using an image that does not exclude data of a pixel having the display color of the information.

9. An image capture apparatus comprising:
    a finder optical system that includes an imaging surface of an image-capturing lens and a display device configured to transmit light forming an optical image and to display information;
    an acquiring unit configured to acquire a first image that is a combined image of the optical image formed on the imaging surface and the information displayed by the display device; and
    a processing unit configured to generate a template image that excludes data of a pixel having a display color of the information from pixels included in a predetermined area of the first image and perform subject detection processing or subject tracking processing using the template image.

10. The image capture apparatus according to claim 9, further comprising:
    a converting unit configured to convert an image according to the predetermined area of the first image into a binary image in which a pixel having a color that is different from the display color among characteristic colors in the image according to the predetermined area of the first image and a pixel having the other colors are displayed with different values,
    wherein the processing unit performs the subject detection processing or the subject tracking processing using the binary image as the template image.

11. The image capture apparatus according to claim 9, wherein the acquiring unit acquires the first image using a metering sensor.

12. A method for controlling an image capture apparatus, wherein the image capture apparatus comprises a finder optical system including an imaging surface of an image-capturing lens and a display device configured to transmit light forming an optical image and to display information, the method comprising:
    acquiring a first image that is a combined image of the optical image formed on the imaging surface and the information displayed by the display device is superimposed;
    generating a template image that excludes data of a pixel having a display color of the information from pixels included in a predetermined area of the first image; and
    performing subject detection processing or subject tracking processing using the template image.

* * * * *